(12) United States Patent
Haddon et al.

(10) Patent No.: US 7,867,468 B1
(45) Date of Patent: Jan. 11, 2011

(54) MULTISCALE CARBON NANOTUBE-FIBER REINFORCEMENTS FOR COMPOSITES

(75) Inventors: Robert C. Haddon, Riverside, CA (US); Mikhail E. Itkis, Riverside, CA (US); Elena Bekyarova, Riverside, CA (US); Aiping Yu, Riverside, CA (US)

(73) Assignee: Carbon Solutions, Inc., Riverside, CA (US)

( * ) Notice: Subject to any disclaimer, the term of this patent is extended or adjusted under 35 U.S.C. 154(b) by 0 days.

(21) Appl. No.: 12/039,526

(22) Filed: Feb. 28, 2008

(51) Int. Cl.
*D01F 9/12* (2006.01)
(52) U.S. Cl. ............... 423/447.1; 977/720; 977/742
(58) Field of Classification Search ............ 423/447.1; 977/720, 742, 784, 961
See application file for complete search history.

(56) References Cited

U.S. PATENT DOCUMENTS

| 4,167,538 | A * | 9/1979 | Taniguchi et al. | 525/438 |
| 6,660,383 | B2 * | 12/2003 | Toyoda et al. | 428/408 |
| 6,793,737 | B2 * | 9/2004 | Yount | 134/3 |
| 2002/0094311 | A1 * | 7/2002 | Smalley et al. | 422/198 |
| 2004/0071624 | A1 * | 4/2004 | Tour et al. | 423/447.1 |
| 2007/0066171 | A1 * | 3/2007 | Bystricky et al. | 442/186 |

FOREIGN PATENT DOCUMENTS

CN 101047086 * 10/2007

OTHER PUBLICATIONS

Gao, B.; Yue, G. Z.; Qiu, Cheng, Y.; Shimoda, H.; Fleming, L.; Zhou, O. Fabrication and Electron Field Emission Properties of Carbon Nanotube Films by Electrophoretic Deposition, Adv. Mater., 2001, 13, No. 23, 1770-1773.*

Gommans, H. H.; Allredge, J. W.; Tashiro, H.; Park, J.; Magnuson, J.; Rinzler, A. G. Fibers of aligned single-walled carbon nanotubes: Polarized Raman spectroscopy, J. Appl. Phys., 2000, 88 (5), 2509-2514.*

Thostenson, E. T.; Li, W. Z.; Wang, D. Z.; Ren, Z. F.; Chou, T. W. Carbon nanotube/carbon fiber hybrid multiscale composites, J. Appl. Phys., 2002, 91 (9), 6034-6037.*

Yamamoto, K.; Akita, S.; Nakayama, Y. Orientation of Carbon Nanotubes Using Electrophoresis, Jpn. J. Appl. Phys., 1996, 35, Part 2, No. 7B, L917-918.*

G. Girishkumar; M. Rettker; R. Underhile; D. Binz; K. Vinodgopal; P. McGinn; P. Kamat. Single-Wall Carbon Nanotube-Based Proton Exchange Membrane Assembly for Hydrogen Fuel Cells, Langmuir 21, 2005, 8487-8494.*

(Continued)

*Primary Examiner*—Jennifer K Michener
*Assistant Examiner*—Carlos Barcena
(74) *Attorney, Agent, or Firm*—Knobbe Martens Olson & Bear LLP

(57) ABSTRACT

Systems and methods for the preparation of reinforcements for composite materials, whereby single- and/or multi-walled carbon nanotubes (CNTs) may be electrophoretically deposited on fibrous substrates for the production of hybrid CNT/fibers. The fibers may include carbon fibers and woven carbon fabrics. The length, as well as the density and orientation of the deposited nanotubes on the fiber surfaces may also be tailored. The strength of the CNT/fiber-matrix interface formed in composites fabricated from the hybrid CNT/fibers may be adjusted by introduction of functional groups on the CNT/fiber surfaces, such as aminophenyl and carboxyphenyl groups.

28 Claims, 10 Drawing Sheets

OTHER PUBLICATIONS

G. Girishkumar; K. Vinodgopal; P.V. Kamat. Carbon Nanostructures in Portable Fuel Cells: Single-Walled Carbon Nanotube Electrodes for Methanol Oxidation and Oxygen Reduction, J. Phys. Chem. B 108, 2004, 19960-19966.*

SES Research, Carbon Nanotubes Specification.*

Toray Industries, Inc. Torayca Product Line, 2005.*

M. W. Marshall, S. Popa-Nita, J. G. Shapter. Measurement of functionalised carbon nanotube carboxylic acid groups using a simple chemical process, Carbon 2006, 44, 1137-1141.*

E. Bekyarova et al., "Multiscale Carbon Nanotube—Carbon Fiber Reinforcement for Advanced Epoxy Composites", *Langmuir* 2007, 23, 3970-3974.

Vinod P. Veedu et al., "Multifunctional composites using reinforced laminae with carbon-nanotube forests", *Nat. Mater.* 2006, 5, 457-462.

Rahul Sen, A. Govindaraj, and C.N.R. Rao, "Carbon nanotubes by the metallocene route", *Chem. Phys. Lett.* 1997, 267, 276-280.

Hui Hu, et al., "Influence of the Zeta Potential on the Dispersability and Purification of Single-Walled Carbon Nanotubes", *J. Phys. Chem. B* 2005, 109, 11520-11524.

Aiping Yu et al., "Application of Centrifugation to the Large-Scale Purification of Electric Arc-Produced Single-Walled Carbon Nanotubes", *J. Am. Chem. Soc.* 2006, 128, 9902-9908.

M. E. Itkis et al., "Purity Evaluation of As-Prepared Single-Walled Carbon Nanotube Soot by Use of Solution-Phase Near-IR Spectroscopy", *Nano Lett.* 2003, 3, 309-314.

Ralph Krupke, Frank Hennrich, Hilbert V. Löhneysen, and Manfred M. Kappes, "Separation of Metallic from Semiconducting Single-Walled Carbon Nanotubes", *Science* 2003, 301, 344-347.

Jie Tang, et al., "Assembly of 1D Nanostructures into Sub-micrometer Diameter Fibrils with Controlled and Variable Length by Dielectrophoresis", *Adv. Mater.* 2003, 15, 1352-1355.

Jian Zhang et al., "Efficient Fabrication of Carbon Nanotube Point Electron Sources by Dielectrophoresis", *Adv. Mater.* 2004, 16, 1219-1222.

J.K.W. Sandler, J.E. Kirk, I.A. Kinloch, M.S.P. Shaffer, A.H. Windle, "Ultra-low electrical percolation threshold in carbon-nanotube-epoxy composites", *Polymer* 2003, 44, 5893-5899.

Sasha Stankovich et al., "Graphene-based composite materials", *Nature* 2006, 442, 282-286.

Aiping Yu, Mikhail E. Itkis, Elena Bekyarova and Robert C. Haddon, "Effect of single-walled carbon nanotube purity on the thermal conductivity of carbon nanotube-based composites", *Appl Phys. Lett.* 2006, 89, 133102-133103.

Xiaoyou Xu et al., "Electrophoretic Analysis and Purification of Fluorescent Single-Walled Carbon Nanotube Fragments", *J. Am. Chem. Soc.* 2004, 126, 12736-12737.

T. W. Chou and F. Ko, *Textile Structural Composites*; Elsevier: Amsterdam, 1988; Russian Edition, Moscow.

R.W. Cahn, E.A. Davis, Im. Ward, *Microstructural Design of Fiber Composites*; Cambridge University Press: Cambridge, U.K., 1992.

E.T. Thostenson, "Carbon Nanotube-Reinforced Composites: Processing, Characterization and Modeling", Ph.D. Thesis, University of Delaware, 2003.

* cited by examiner

MULTISCALE CARBON NANOTUBE-FIBER REINFORCEMENTS FOR COMPOSITES

STATEMENT REGARDING FEDERALLY SPONSORED R&D

This invention was made with Government support under Contract Numbers FA09550-04-C-0122 and FA09550-06-C-004 awarded by the Air Force Office of Scientific Research (AFOSR). The Government has certain rights in this invention.

BACKGROUND OF THE INVENTION

1. Field of the Invention

Embodiments of the present disclosure relate to reinforcements for composite materials and, in particular, concerns electrophoretic deposition of carbon nanotubes on fiber substrates to form hybrid carbon nanotube fiber reinforcements.

2. Description of the Related Art

The use of high-performance, fiber-reinforced composites has expanded substantially in recent years, as improvements in these composites have allowed them to meet the final performance requirements of advanced aerospace systems. For example, extensive research and development in carbon fiber-reinforced composites has led to significant improvements in the properties of these composites, such as in-plane mechanical properties. Furthermore, composites formed using 2-D and 3-D woven fiber reinforcements can be formed into the final net shapes.

The out-of-plane properties of fiber-reinforced composites remain problematically low, however. Out-of-plane properties are dominated by the matrix surrounding the reinforcing fibers, which is relatively weak compared to the fibers. Additionally, fiber-reinforced composites generally possess matrix-rich regions within the interlaminar region between the fibers and these regions have proven difficult to reinforce with fiber reinforcements. As a result, cracks may easily initiate and propagate under load within these regions, leading to composite failure.

From the foregoing, then, there exists a continued need for improved reinforcements for composite materials.

SUMMARY OF THE INVENTION

Embodiments of the disclosure provide a method of forming a hybrid carbon nanotube-fiber structure. The method comprises selecting a plurality of fibers and obtaining a first carbon nanotube dispersion. The dispersion comprises a first plurality of carbon nanotubes, where the concentration of the first plurality of carbon nanotubes within the dispersion is greater than or equal to about 0.01 mg/mL. The method further comprises placing the plurality of fibers in a vessel containing the first dispersion and adjacent to a plurality of electrodes. The method also comprises generating an electric field between the plurality of fibers and a plurality of electrodes so as to cause at least a portion of the CNTs within the dispersion to be deposited on the surface of the fibers.

In an embodiment, the plurality of fibers comprise carbon-based fibers.

In an embodiment, the method further comprises forming a woven or non-woven fabric from the carbon nanotube-fiber structure.

In an embodiment, the plurality of fibers comprise a substantially continuous length of fibers which are continuously fed through the vessel so as to produce a substantially continuous length of fibers having carbon nanotubes deposited on their surface.

In an embodiment, the carbon nanotubes comprise at least one of single-walled and multi-walled carbon nanotubes.

In an embodiment, the length of the first plurality of carbon nanotubes ranges between approximately 200 nm to 10 μm.

In an embodiment, the method further comprises repeating the method with the same plurality of fibers, where a second plurality of carbon nanotubes is obtained which possess a length between approximately 200 nm to 10 μm, and where the length of the first and second plurality of carbon nanotubes are not equal.

In an embodiment, the first plurality of carbon nanotubes are dispersed in a medium selected from water and alcohols.

In an embodiment, the dispersion further comprises sodium hydroxide in a concentration less than about 1 vol. % on the basis of total volume of the dispersion so as to facilitate deposition of the CNTs on the fiber.

In an embodiment, the concentration of the first plurality of carbon nanotubes within the dispersion is approximately 0.01-0.1 mg/mL.

In an embodiment, the electric field comprises a DC electric field having a strength of about 4 to 20 V/cm.

In an embodiment, the method further comprises, after deposition of the carbon nanotubes, placing at least a portion of the plurality of fibers within an electric field oriented substantially perpendicular to the length of the plurality of fibers, where the electric field strength is approximately 1 to 4 kV/cm, and where the plurality of fibers are held within the electric field for between approximately 2 to 4 hours so as to induce the deposited CNTs to reorient themselves substantially perpendicular to the length of the fibers.

In an embodiment, the method further comprises, prior to placement of the fibers within the dispersion, removal of a sizing from the surface of the fibers by annealing the fibers at a temperature greater than or equal to about 700° C. and subsequently refluxing the fibers in nitric acid having a molarity ranging between about 7 to 16M for between about 30-60 minutes.

In an embodiment, the method further comprises impregnating the carbon-nanotube/fiber structure with a polymer matrix to form a composite material.

In another embodiment, a method of forming a hybrid carbon nanotube-fiber structure is provided. The method comprises selecting a plurality of carbon nanotubes, treating the plurality of carbon nanotubes with nitric acid so as to introduce oxygen containing functional groups onto the carbon nanotubes, and dispersing the carbon nanotubes within a dispersion medium in a selected concentration. The method further comprises selecting a plurality of carbon-based fibers and electrophoretically depositing at least a portion of the carbon nanotubes contained within the carbon nanotube dispersion on the surface of the carbon-based fibers.

In an embodiment, the carbon nanotubes comprise at least one of single-walled and multi-walled carbon nanotubes.

In an embodiment, the carbon nanotubes vary in length from about 200 nm to 10 μm.

In an embodiment, the nitric acid strength is between about 7 to 16 M and the refluxing time is between about 30 minutes to 12 hours.

In an embodiment, the oxygen containing functional groups comprise carboxylic acid groups.

In an embodiment, the dispersion medium is selected from water and alcohols.

In an embodiment, the dispersion medium further comprises NaOH in a concentration less than or equal to about 1% by volume based upon the total volume of the dispersion.

In an embodiment, the concentration of carbon nanotubes within the dispersion ranges between about 0.01 and 0.1 mg/mL.

In an embodiment, the method further comprises modification of the surface of the carbon-based fiber and carbon nanotubes by grafting of aminophenyl and carboxyphenyl groups to the surfaces.

In an embodiment, the surface modification comprises immersion of the carbon nanotube/carbon-based-fiber structure, for between approximately 30 minutes to 4 hours, in a diazonium salt solution prepared from one of acetonitrile, dimethylformamide, and water and purged with an inert gas.

In another embodiment surface modification further comprises applying a potential, corresponding to about the reduction peak in the cyclic voltammogram of the diazonium salt, to the carbon nanotube/carbon-based-fiber structure for between about 1 to 3 hours.

In an embodiment, the method further comprises, after deposition of the carbon nanotubes, placing at least a portion of the plurality of fibers within an electric field oriented substantially perpendicular to the length of the plurality of fibers, where the electric field strength is approximately 1 to 4 kV/cm, and where the plurality of fibers are held within the electric field for between approximately 2 to 4 hours so as to induce the deposited CNTs to reorient themselves substantially perpendicular to the length of the fibers.

In an embodiment, the method further comprises, prior to placement of the fibers within the dispersion, removal of a sizing from the surface of the fibers.

In an embodiment, the method further comprises impregnating the carbon-nanotube/fiber structure with a polymer matrix to form a composite material.

DETAILED DESCRIPTION

Figure 1A:
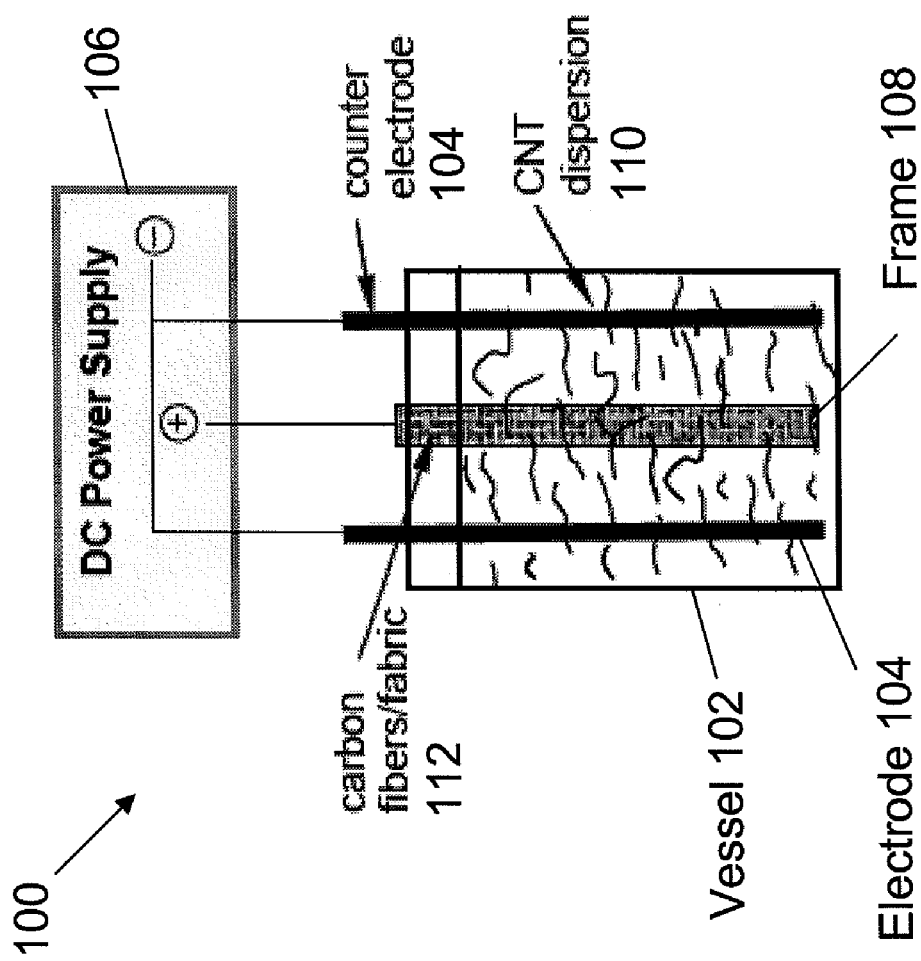
FIGS. 1A-1B are schematic illustrations of embodiments of electrophoretic deposition systems for placement of carbon nanotubes on fiber surfaces.

Identifying new techniques for improving the out-of-plane properties of fiber-reinforced composites is an area of ongoing investigation. One approach being considered is the use of carbon nanotubes (CNTs) for reinforcement of matrix-rich regions. This approach benefits both from the micro-scale reinforcement provided by the fibers, as well as the complementary, nano-scale reinforcement offered by CNTs. For example, it has been demonstrated that the combination of traditional carbon fibers with carbon nanotubes in epoxy matrix composites leads to enhanced fiber/polymer interfacial load transfer. Further, it has been recently reported that epoxy composites reinforced with 2-D, woven fabrics of silicon carbide (SiC) that are further coated with multi-walled carbon nanotubes (MWNTs) exhibit enhanced out-of-plane mechanical and electrical properties. Notably, however, these studies have employed chemical vapor deposition (CVD) to deposit CNTs on the reinforcing fiber surface.

While CVD is an efficient technique for the growth of CNTs on a variety of surfaces, CVD imposes serious limitations on the practical application of this technique to the fabrication of carbon nanotube-reinforced structural composites. In one aspect, the high temperatures used in CVD processing may remove any protective sizing that is applied to the fiber during manufacturing, increasing the likelihood of damaging the fibers during handling and processing. In another aspect, the chemical reactions taking place in CVD may degrade the strength of the fiber substrates upon which the CNTs are deposited, adversely impacting the mechanical properties of composites fabricated from the fiber reinforcement. In a further aspect, CVD reaction chambers are limited in size, complicating the processing of large area fiber reinforcements and composite panels formed therefrom.

Embodiments of the present disclosure present systems and methods for electrophoretic deposition of carbon nanotubes (CNTs) on the surface of fibers to form hybrid CNT/fiber structures. In certain embodiments, the fibers may comprise carbon fibers, carbon papers, and carbon fabrics. Beneficially, electrophoresis circumvents many of the drawbacks and limitations encountered in CVD deposition of CNTs. For example, electrophoresis is a simpler and cheaper process than CVD, allowing CNT deposition to be performed without the costly equipment, sophisticated process controls, and highly trained operators required for successful CVD runs. Furthermore, electrophoresis is a versatile deposition technique which can be accomplished with or without the removal of sizing from the fiber substrate. Additionally, electrophoresis may be readily automated and scaled for industrial applications. Also, both single- and multi-walled CNTs may be electrophoretically deposited to form hybrid CNT-fibers.

In further embodiments, structural composites reinforced with embodiments of the hybrid CNT/fiber structures are discussed. The hybrid CNT/fibers may be infiltrated with matrix materials to form multi-scale, hybrid CNT/fiber-reinforced composites. In one embodiment, epoxy resins may be infiltrated into hybrid CNT/fibers through vacuum-assisted resin transfer molding (VARTM) processes to form such composites.

In certain embodiments discussed herein, electrophoretic deposition of carbon nanotubes is discussed in the context of carbon fibers. It may be understood, however, that carbon fibers are discussed for example purpose only and that embodiments of the disclosed systems and methods may be employed with fibers of different materials without limit.

It may be further understood that fibers comprise their ordinary dictionary definition and may further include unidirectional fiber filaments, tows, and bundles, as well as 2-D and 3-D woven and non-woven fabrics formed therefrom.

One embodiment of a system 100 for electrophoretic deposition of carbon nanotubes on the surface of carbon fibers is illustrated in FIG. 1A. The electrophoretic deposition system 100 comprises a vessel 102, a plurality of electrodes 104, a power supply 106. The carbon fabric or fibers 112 are fixed in a frame 108 and the frame 108 is immersed in a dispersion of carbon nanotubes 110, between the electrodes 104. The power supply 106 is employed to generate an electric field between the carbon fibers 112 and the electrodes 104. The electric field causes the CNTs within the dispersion 110 to migrate towards, and deposit on, the surface of the carbon fibers 112. The power supply 106 may be configured to provide direct and alternating currents, as well as operate under potentiostatic or galvanostatic conditions.

In one embodiment, the frame and electrodes are formed from electrically conductive materials including, but not limited to, stainless steel. Advantageously, use of the frame 108 to support the carbon fibers 112 facilitates CNT deposition upon fibers 112, particularly fibers 112 having a relatively large area. In one aspect, the fibers 112 can be distorted and damaged if unsupported. Furthermore, the ease with which the fibers 112 are distorted further increases with the size of the fiber 112 being processed. Thus, the frame 108 preserves the structural integrity of the fibers 112 during processing. In another aspect, the frame 108 provides a conduction pathway which results in a substantially uniform electrical potential distribution during the electrodeposition. As the deposition of the CNTs is strongly influenced by the electric field, the substantially uniform potential promotes substantially uniform distribution of the CNTs on the surface of the carbon fiber 112.

Figure 1B:
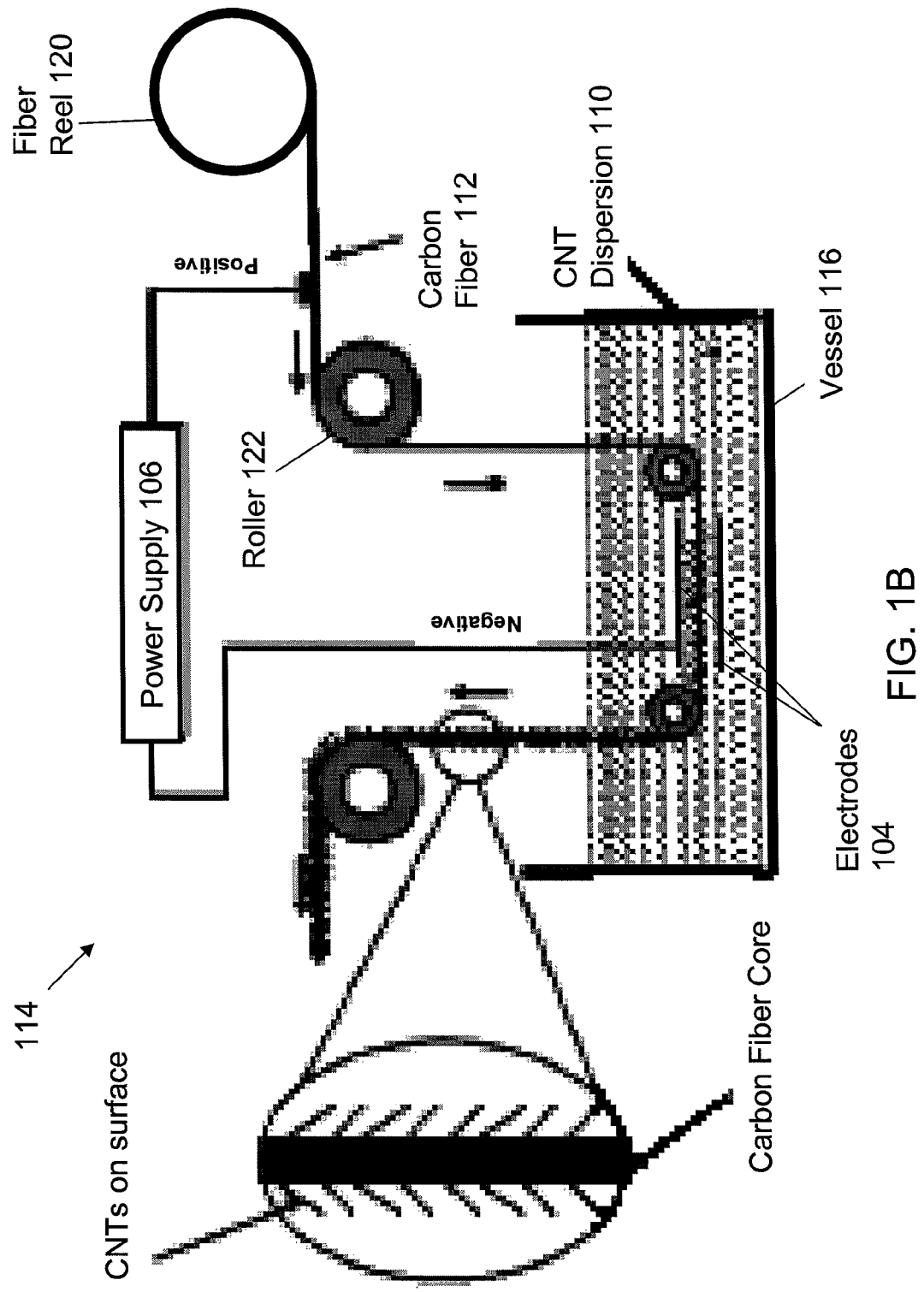
Figure 2:
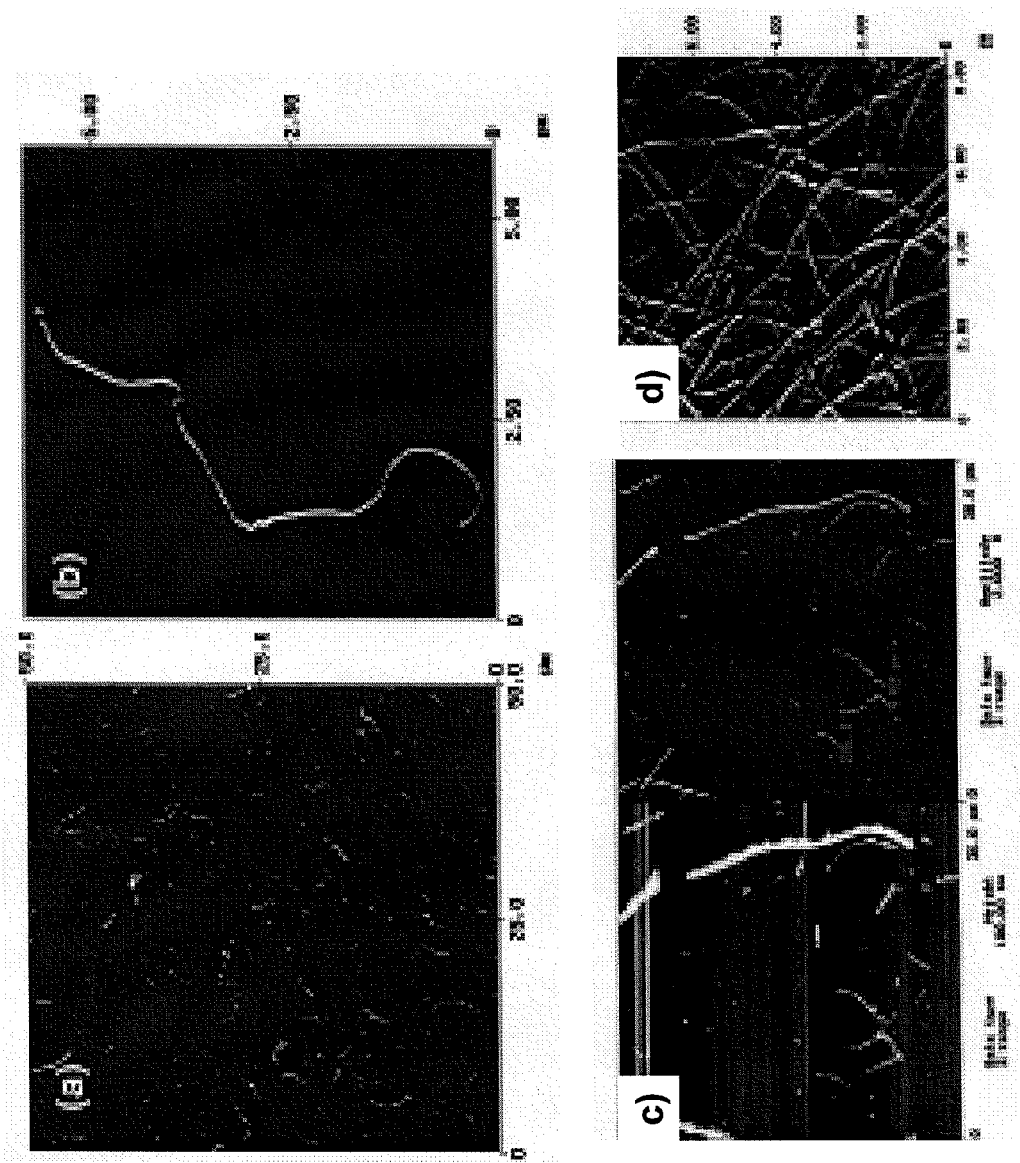
FIGS. 2A-2D are AFM micrographs of multi-walled carbon nanotubes (MWNTs) of various lengths which have been treated with nitric acid.

FIG. 1B illustrates another embodiment of the electrophoretic deposition process employing a continuous deposition system 114. The continuous deposition system 114 is similar in many aspects to the deposition system 100 but with modifications configured to allow substantially continuous deposition of CNTs on the carbon fiber 112.

As shown in the embodiment of FIG. 1B, a substantially continuous length of fiber 112 may be held under tension and routed through the system 114. For example, as illustrated in FIG. 1B, fiber 112 may be dispensed from a reel 120 and directed through the system 114 using a plurality of rollers 122. The fiber 112 is directed to pass through a vessel 116 which contains the CNT dispersion 110 and a plurality of electrodes 104 which flank the fiber 112 while it is within the dispersion 110. The power supply 106 is in electrical communication with the fibers 112 and the electrodes 104 so as to generate a potential difference which causes the CNTs within the dispersion 110 to migrate towards, and deposit on, the surface of the carbon fibers 112 while the fibers 112 are located between the electrodes. Advantageously, because the fibers 112 are moving through the system 114, the portion of the fiber 112 which is located between the electrodes 104 is continuously advanced, allowing deposition to take place, without substantial interruption, for the length of the fiber 112.

The carbon fiber reinforcement may be provided in any selected configuration. Examples may include, but are not limited to, filaments, fiber bundles or tows, as well as 2D and 3D woven and non-woven fabrics, cloths, and papers. In further embodiments, the fiber may comprise electrically conductive materials such as metals and ceramics, as well as boron and carbon. Examples of polymer fibers may include polyethylene and aromatic polyamides (aramids). Examples of ceramic fibers may include aluminum oxide, silicon carbide, and silicon nitride. In one embodiment, the fiber comprises Magnamite IM7 (Hexcel Corporation), a high-performance, intermediate modulus carbon fiber.

The configuration of the deposited carbon nanotubes may be varied, as desired. In certain embodiments, electrophoretic deposition may be performed using single-walled carbon nanotubes (SWNT), multi-walled nanotubes (MWNTs), and combinations thereof. Such SWNTs may possess lengths of about 200 nm to 1 µm. The SWNTs may further possess a diameter of about 1.4 nm individually. The SWNTs may additionally be configured into bundles comprising a plurality of SWNTs, the bundles having diameters of about 4-6 µm. In alternative embodiments, electrophoretic deposition may be performed using multi-walled carbon nanotubes (MWNTs). Such MWNTs may possess lengths of about 1-10 µM and diameters of about 20-100 nm.

In one embodiment, the SWNTs may comprise purified SWNTs produced by electric-arc methods. An example of such SWNTs is P3-SWNT, produced by Carbon Solutions Inc., Riverside, Calif. In certain embodiments, at least one of the sidewalls and ends of the SWNTs are functionalized with a plurality of oxygen containing functional groups. For example, the oxygen containing functional group may comprise carboxylic acid groups. The relative carbonaceous purity of the SWNTs is approximately 90%, as estimated by the solution-phase near-IR (NIR) spectroscopic technique using reference sample R2, as discussed by Itkis et al, in *Nano Lett.*, 2003, 3, 309-314, hereby incorporated by reference in its entirety.

Embodiments of the MWNTs may be produced by chemical vapor deposition (CVD). The growth is performed using xylene as a carbon precursor and ferrocene as a catalyst. The CVD growth parameters are further selected so as to produce MWNTs having a lengths ranging between about 120-250 µm and a diameters ranging between about 20-100 nm.

In further embodiments, the MWNTs may be treated with nitric acid prior to dispersion within the CNT dispersion. Beneficially, the nitric acid treatment may be employed to reduce the length of the CNTs to within a selected range. In further benefit, the nitric acid treatment also introduces carboxylic acid groups into at least one of the sidewalls and ends of the MWNTs, which facilitates their dispersion in water. In one embodiment, the MWNTs may be refluxed in nitric acid having a concentration between approximately 7 to 16 M for about 30 minutes to 12 hours to yield MWNTs with lengths ranging between approximately 1 to 10 µm. The MWNTs may be further separated by length by centrifuge or density separation methods.

In one example, as-grown MWNTs with a length of approximately 120-250 µm may be refluxed in nitric acid for between approximately 1.5 to 2h with the objective of reducing the length of the MWNTs to within a range of approximately 1-10 µm. The length of MWNTs after nitric acid reflux may be analyzed by atomic force microscope (AFM) to correlate the refluxing time to the MWNT length. FIGS. 2A-2D illustrate typical AFM micrographs of refluxed MWNTs. In one embodiment, refluxing times of approximately 1.5 h provide MWNTs having lengths of approximately 2-5 µm, while reflux times greater than about 2 h reduce the length of the MWNTs to approximately 1 μm.

In one embodiment, the CNTs may be negatively charged. Under these circumstances, the electrophoresis system 100 is configured such that the electrodes 104 are negatively charged with respect to the carbon fiber 112. The negative charge on the CNTs is attributed to the carboxylic acid groups introduced in the nanotubes during nitric acid treatment. The adsorption of hydroxyl anions from the dispersion 110 may also contribute to the net negative charge on the CNTs.

In alternative embodiments, a positive charge may be induced on the carbon nanotubes. For example, a positive charge may be induced by the use of magnesium chloride ($MgCl_2$). One embodiment of such a technique is discussed in detail in B. Gao, et al., Fabrication of Electron Field Emission Properties of Carbon Nanotube Films by Electrophoretic Deposition. *Adv. Mater.* 2001, 23, 1770-1773, the entirety of which is incorporated by reference. In such embodiments, the polarity of the system 100 may be reversed such that the electrodes 106 are positively charged with respect to the carbon fiber 112.

In one embodiment, the CNT dispersion 110 is prepared by scattering the selected CNTs a liquid medium. The dispersion medium may include, but is not limited to, water and organic solvents. In one embodiment, the organic solvent may comprise alcohols, such as ethanol.

The choice of dispersion medium may be made, at least in part, based upon the intended application of the hybrid CNT/fibers. For example, the electrolysis of water occurs at relatively low applied voltages, causing a portion of the water in aqueous dispersions to be converted into hydrogen and oxygen gases. As a result, aqueous dispersions may deposit CNTs on the carbon fibers in a relatively rough morphology, with the nanotubes protruding from the fiber surface. While this morphology may be advantageous in certain applications, the inclusion of gas bubbles in the final product may be undesirable in other applications, rendering the use of aqueous dispersions problematic. Conversely, a disadvantage of organic liquids is that they have a lower dielectric constant than water, which limits their ability to charge the nanotubes. Thus, depending on the application, certain dispersion media may be favored over others.

Dispersion of the CNTs may be accomplished through a plurality of mechanisms, including, but not limited to, mixing, ultrasonication (also referred to as sonication), and combinations thereof. Embodiments of the dispersion 110 may be produced with CNT loadings ranging between approximately 0.01 to 0.1 mg/mL. In one embodiment, the CNTs are dispersed by sonication in a bath sonicator. The sonic power of the bath may range between approximately 75 to 270 W. The time of sonication may further range between approximately 2 to 12 hours.

Agents may be further added to the CNT dispersion to enhance the electrical conductivity of the dispersion medium. Embodiments of such agents may include, but are not limited to, electrolytes. In one embodiment, the electrolyte may comprise sodium hydroxide (NaOH) in a concentration of less than or equal to about 1% by volume of the dispersion. In alternative embodiments, about 20 mg/mL NaOH is present in the dispersion. The NaOH concentration is limited, as the NaOH increases the pH of the dispersion and decreases the stability of the nanotubes in water. In alternative embodiments, the electrolyte comprises potassium hydroxide (KOH).

Once the CNT dispersion 110 and the carbon fibers 112 are placed within the vessel 102, the power supply 106 is activated to begin the electrophoretic deposition process. In one embodiment, the power supply 106 comprises a DC electrical source. In certain embodiments, a field strength of between approximately 4 to 10V/cm is generated between the electrodes 104 and carbon fibers 112. The deposition time may range between approximately 30 minutes to 24 h. In certain embodiments, the deposition time is approximately 1 to 2 hours.

In alternative embodiments, the power supply 106 comprises an AC electrical source configured to perform deposition by dielectrophoresis. In such embodiments, the carbon nanotubes may be provided such that they are substantially without charge. Using the AC power source, a potential difference of between approximately 1 to 5 V may be applied between the electrodes 104 and carbon fibers 112 so as to generate an electric field suitable for deposition.

Following deposition of the CNTs on the carbon fibers 112, the fibers 112 are removed from the electrophoresis bath and dried. Drying may be performed in air or vacuum at ambient or elevated temperatures. In one embodiment, the drying temperature may range between approximately 23° C. to 150° C. The drying time may further vary between approximately 1 to 24 hours.

In further embodiments, the deposition process may be repeated, as necessary. For example, the deposition process may be iterated using CNTs having different lengths in each iteration.

In additional embodiments, woven or non-woven fabrics may be formed from the hybrid CNT/fiber.

Hybrid CNT/fibers produced as discussed above may be combined with matrix materials to form composites. The matrix materials may include, but are not limited to, polymers, ceramics, and metals. Examples of polymers include epoxies, polyesters, polyethers, polyimides, nylons, polycarbonates, and vinyl esters. Examples of ceramics include glasses (borosilicate, soda-lime), glass ceramics (lithium aluminosilicate, magnesium aluminosilicate), mullite, magnesium oxide, silicon nitride, aluminum oxide, and silicon carbide. Examples of metals include aluminum, copper, nickel, titanium, steels, and alloys thereof.

In one embodiment, the CNT/carbon fibers may be infiltrated with epoxy resins. Such epoxies may, in certain embodiments, be infiltrated into the hybrid CNT/fibers using Vacuum Assisted Resin Transfer Molding (VARTM).

VARTM processing of composites possesses a number of advantages. In one aspect, VARTM processing may be performed at approximately room temperature, avoiding the need for expensive heating mechanisms. In a further aspect, VARTM may be employed to form large, as well as integral, composite parts, reducing the total number of parts necessary to form a desired structure. In an additional aspect, substantially any fiber may be employed in conjunction with VARTM processing. Advantageously, then, a wide variety of CNT/fiber-reinforced composite may be simply and economically fabricated by VARTM.

Figure 3A:
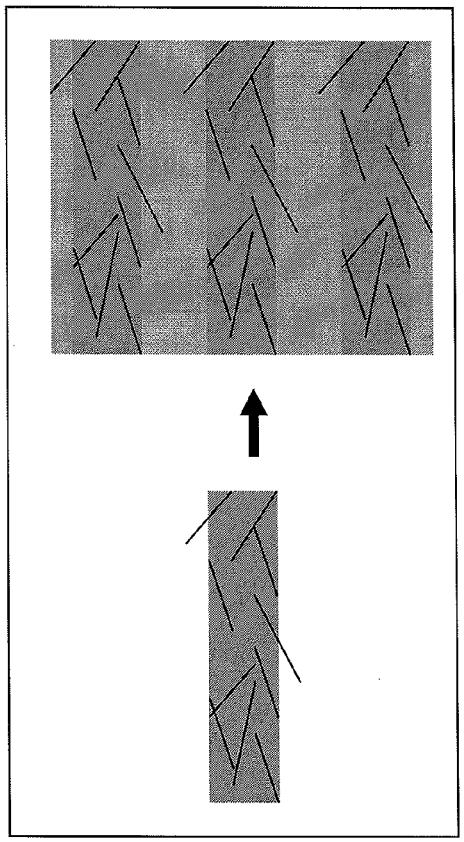
FIGS. 3A-3B illustrate a composite reinforced with CNTs deposited on the carbon fibers, where the CNTs are aligned substantially perpendicular to the fibers.
Figure 3B:
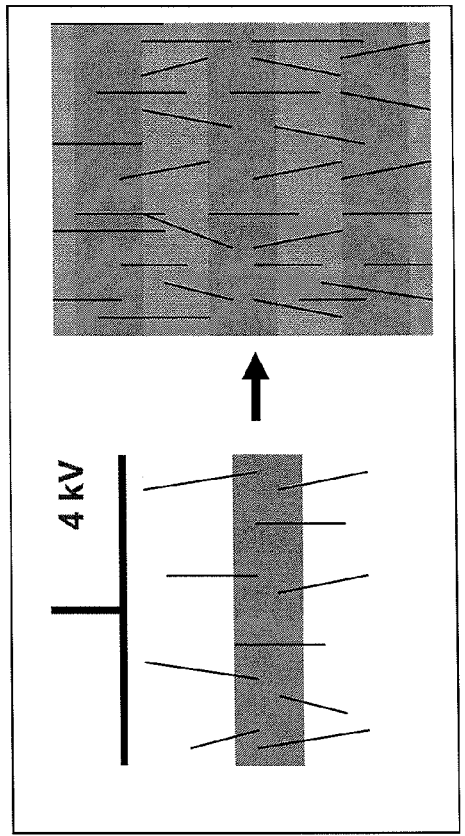

In alternative embodiments, the hybrid CNT/fibers may be post-processed following deposition in order to adjust their orientation. It is anticipated that the orientation of the CNTs upon the fiber surface will play a significant role in the effectiveness of hybrid CNT/fibers as reinforcements in composite materials. FIGS. 3A and 3B schematically illustrate embodiments of two such orientations of deposited CNTs, substantially parallel to and perpendicular to the fibers upon which they are deposited.

Orientation of CNTs substantially perpendicular to the fiber surface holds promise for more efficient reinforcement of the matrix rich regions of composites than do CNTs which are oriented substantially parallel to fiber surface. While either orientation increases the volume fraction of reinforcement provided by the hybrid CNT/fibers, the introduction of carbon nanotubes perpendicular to surface of the fibers more efficiently increases the reinforcement volume fraction of the hybrid CNT/fiber structure. Perpendicularly oriented CNTs further reduce the fraction of unreinforced, matrix-rich regions, which are susceptible to crack formation and propagation. In one advantage, the perpendicularly oriented CNTs can reduce the cost of the hybrid reinforcement, as significantly less CNTs are necessary in this configuration to provide effective levels of reinforcement, as compared with other CNT orientations. Furthermore, this orientation process may be implemented and scaled up without difficulty.

Figure 4:
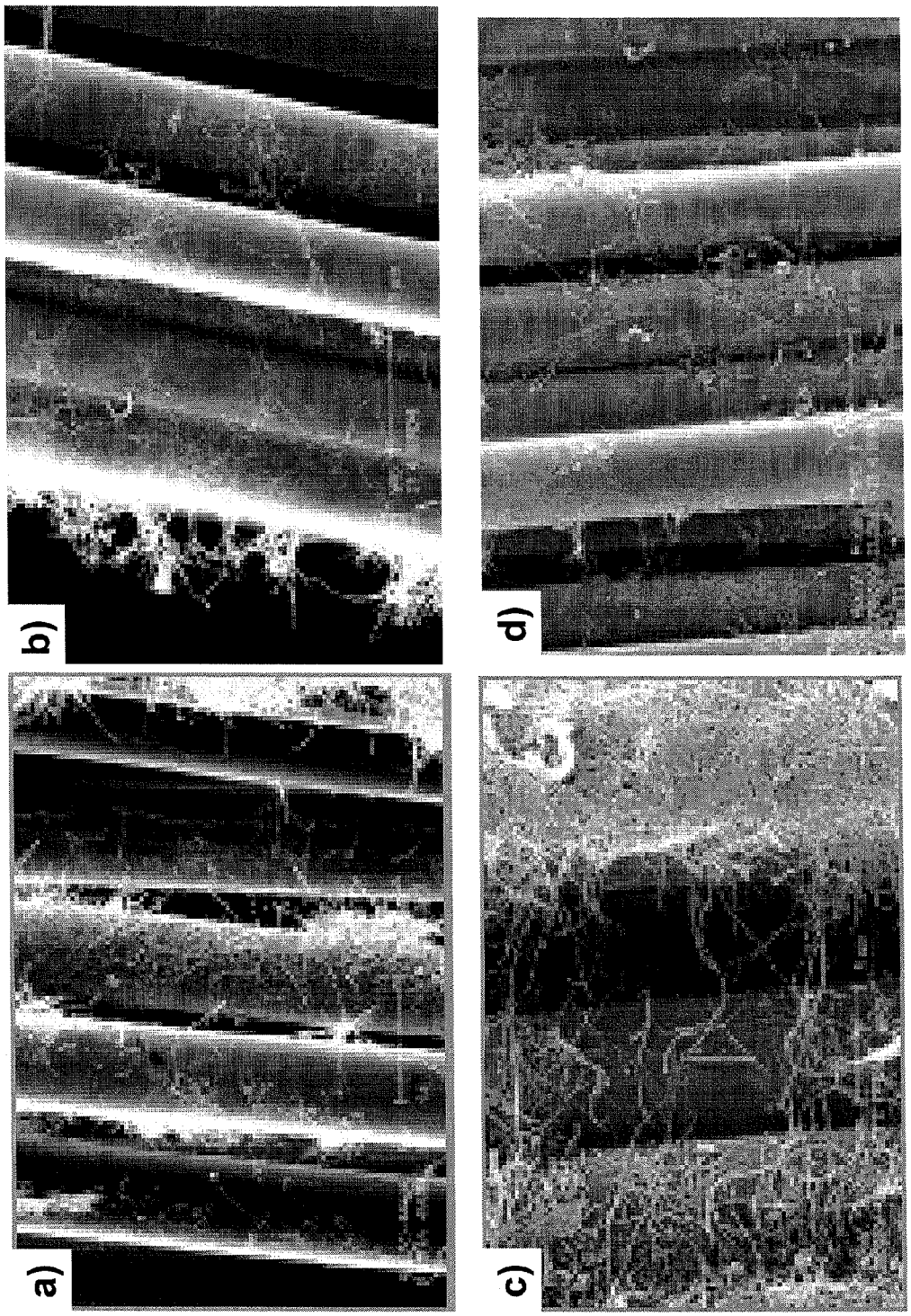
FIGS. 4A-4D are SEM micrographs of IM7 carbon fibers with electrodeposited MWNTs, illustrating projection of the MWNTs from the carbon fiber surface; (4A-4B) fibers post treated using an electrical field of about 2 kV/cm; (4C-4D) fibers post treated using an electrical field of about 4 kV/cm.

FIGS. 4A-4D illustrate SEM images of embodiments of IM7 carbon fibers having electrodeposited MWNTs which were post treated using an electric field oriented approximately perpendicular to the hybrid CNT/fiber structures for a selected time interval in order to modify the CNT orientation. FIGS. 4A-4B illustrate the results of post treatment at about 2 kV/cm, while FIGS. 4C-4D illustrate the results of post treatment at approximately 4 kV/cm. The strong electrical charge causes reorientation of the CNTs and their protrusion from the carbon fiber surface. In one embodiment, the electrical field comprises a DC electrical field of approximately 2-4 kV/cm. The electrical field may further be applied for times ranging between approximately 2-4 hours, in air or in vacuum.

These micrographs dramatically illustrate the large fraction of deposited MWNTs which protrude from the carbon fiber surface and further demonstrate that the fraction of CNTs which are oriented substantially perpendicular to the fibers increases with the application of higher electric fields for comparable time periods. Thus, embodiments of the post-deposition processing provide a highly effective route for adjusting the orientation of CNTs with respect to the fibers.

Beneficially, as illustrated above, embodiments of the presently disclosed hybrid CNT/fibers may be employed to reinforce both the fiber-matrix interface of composites and matrix-rich composite regions. Furthermore, engineering of the CNT/fiber reinforcements can provide new routes towards enhancement of out of plane composite performance, as discussed in the examples below.

EXAMPLES

In the following examples, embodiments of the electrophoresis process and composites formed from the hybrid CNT/fibers are examined in greater detail. The examples highlight the adaptability of the electrophoretic deposition process. It may be understood, however, that these examples are discussed for illustrative purposes and should not be construed to limit the embodiments of the invention.

Example 1

Fiber Sizing

In certain embodiments, the carbon fibers comprise a polymer sizing in the as-received condition. The sizing substantially coats the fibers, protecting them from mechanical and environmental damage during storage and handling. To investigate the effects of the sizing on CNT deposition, CNTs were deposited on carbon fibers with and without sizing, as discussed above.

The carbon fibers were subsequently annealed to substantially remove the polymer sizing, followed by an oxidative treatment comprising refluxing in nitric acid. The goal of the oxidative treatment was to introduce functional groups, to remove weak outer layers of the fibers, and to texture the fiber surface. Thus, the pretreatment is anticipated to impart hydrophilicity to the carbon fiber and increase the interfacial area, facilitating the deposition and binding of carbon nanotubes. One concern with nitric acid treatment, however, is that this oxidative treatment can result in non-uniform etching of the carbon fiber and loss of fiber tensile strength.

Initially, the carbon fibers were annealed at approximately 700° C. in vacuum. Subsequently, carbon fibers were refluxed under two conditions, approximately 16M nitric acid for about 30 min and 7M $HNO_3$ for approximately 1 hour. The fibers were examined by Scanning Electron Microscopy (SEM) after nitric acid treatment and after CNT deposition. For comparison, as-received carbon fibers were similarly examined before and after electrophoretic CNT deposition.

Figure 5:
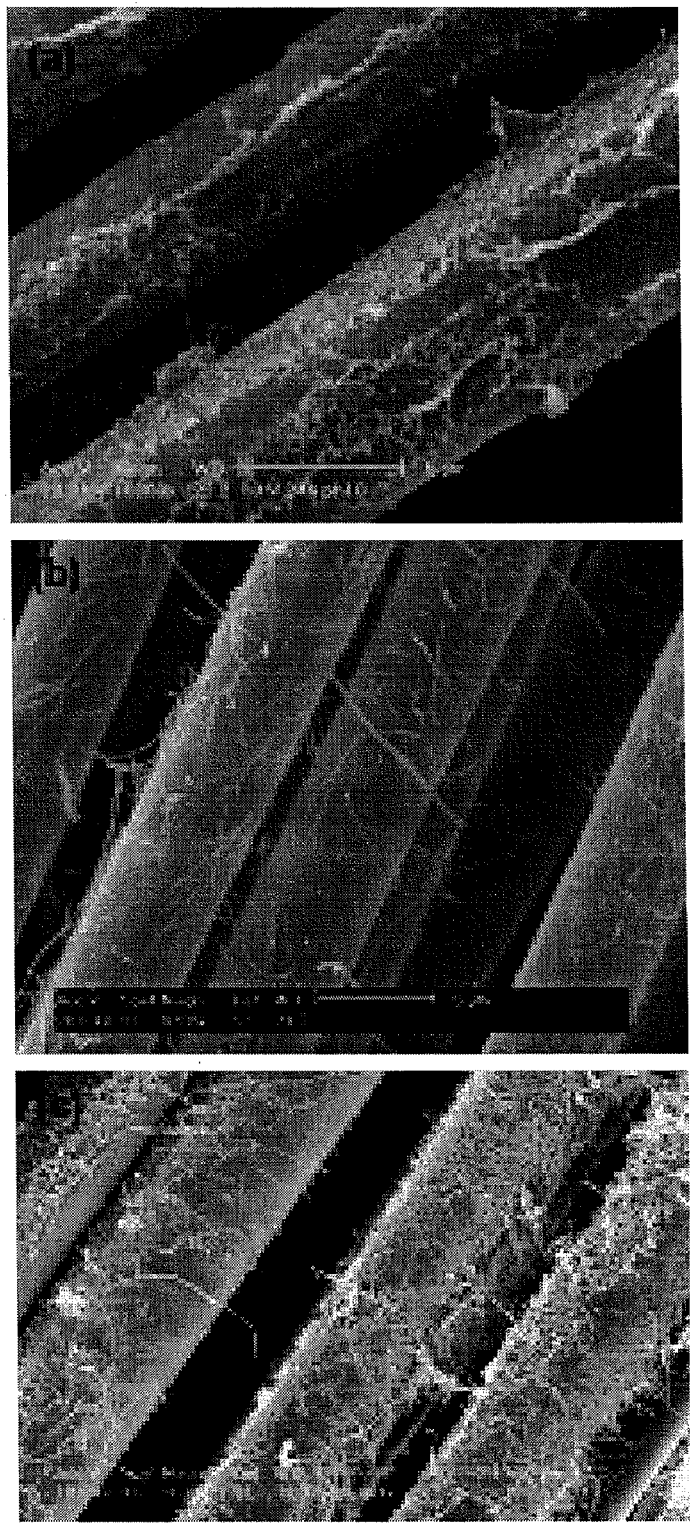
FIGS. 5A-5C are SEM micrographs of carbon fibers having carbon nanotubes deposited by electrophoresis; (5A) (SWNTs); (5B, 5C) MWNTs.

FIGS. 5A-5B are SEM micrographs of nitric acid treated carbon fibers upon which SWNTs and MWNTs, respectively, were deposited. FIG. 5C is an SEM micrograph of as-received carbon fibers upon which SWNTs were deposited. The micrographs illustrate that both SWNTs and MWNTs are substantially homogeneously deposited on the surface of carbon fibers 112, regardless of the condition of the fibers prior to deposition. Advantageously, these results indicate that the pretreatment of the carbon fabric has substantially no effect on the deposition of carbon nanotubes on the carbon fiber surface by electrophoresis.

The electrophoretic deposition of the CNTs was completed after approximately 2 h. To facilitate the deposition of carbon nanotubes, sodium hydroxide in a concentration less than about 1% was added to the dispersions. This addition reduced the deposition to approximately 1 h, while substantially preserving the homogeneity of the carbon nanotube coating.

It is of further interest to note that a difference in the morphologies of the deposited SWNTs and MWNTs are also observed in the SEM images. The SWNTs form a network of interconnected nanotube bundles, which appear tightly associated with the carbon fiber surface, while the MWNTs deposit as substantially individual tubes, with some MWNTs protruding from the carbon fiber surface and interconnecting the carbon fibers within the bundle. It has been reported that fibrils of SWNTs and MWNTs assembled by electrophoresis also have slightly different morphologies, attributed to the more rigid structure of the MWNTs. Another reason for the film-like deposition of SWNTs is their tendency to form bundles.

Example 2

Deposition from Aqueous Dispersion

In Example 2, the deposition of MWNTs from aqueous dispersions was examined. MWNTs were dispersed in water by sonication in a bath sonicator and deposited on IM7 carbon fiber using a potential difference of approximately 10V for durations of about 12 and 24 hours.

Figure 6:
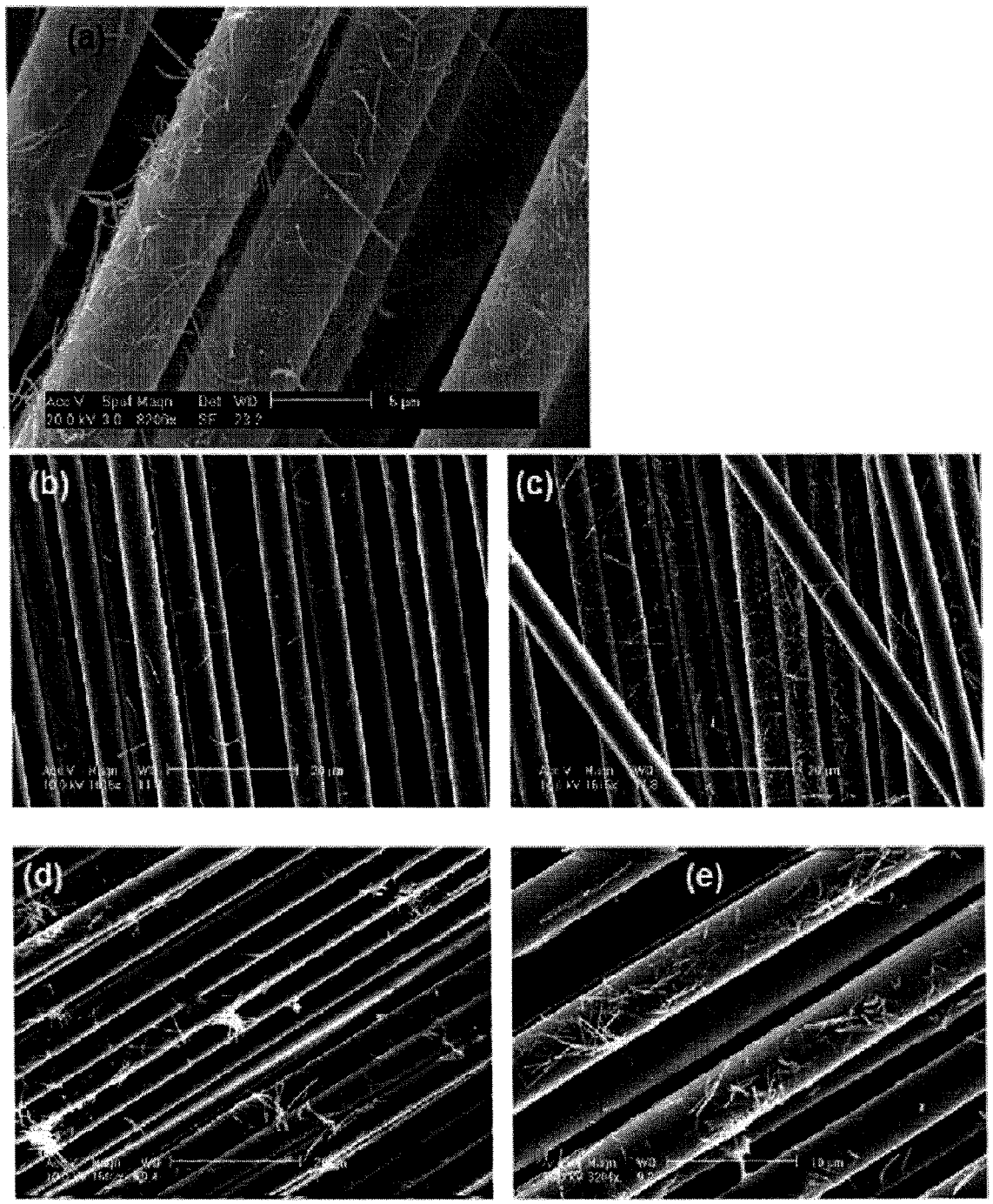
FIGS. 6A-6E are SEM micrographs of IM7 carbon fibers and fabric with electrophoretically deposited CNTs on the surface; (6A) woven IM7 fabric; (6B-6E) unidirectional IM7 fibers.

The resulting hybrid CNT/fibers are illustrated in the SEM micrographs of FIGS. 6A-6E, where the fiber in FIG. 6A is a woven IM7 fabric and the fibers in FIGS. 6B-6E are unidirectional. The micrographs illustrate that the electrophoretic deposition provides a substantially uniform coating of MWNTs on the carbon fibers. Furthermore, the density of nanotubes on the fiber surface is found to increase with deposition time. Advantageously, these results indicate that the orientation of the fiber, unidirectional versus woven, does not play a significant role in the CNT deposition and that embodiments of the electrophoresis deposition process may be employed to similar effect on fibers of varying directionality and weave.

Example 3

Deposition from Aqueous Dispersion with Electrolyte

Figure 7:
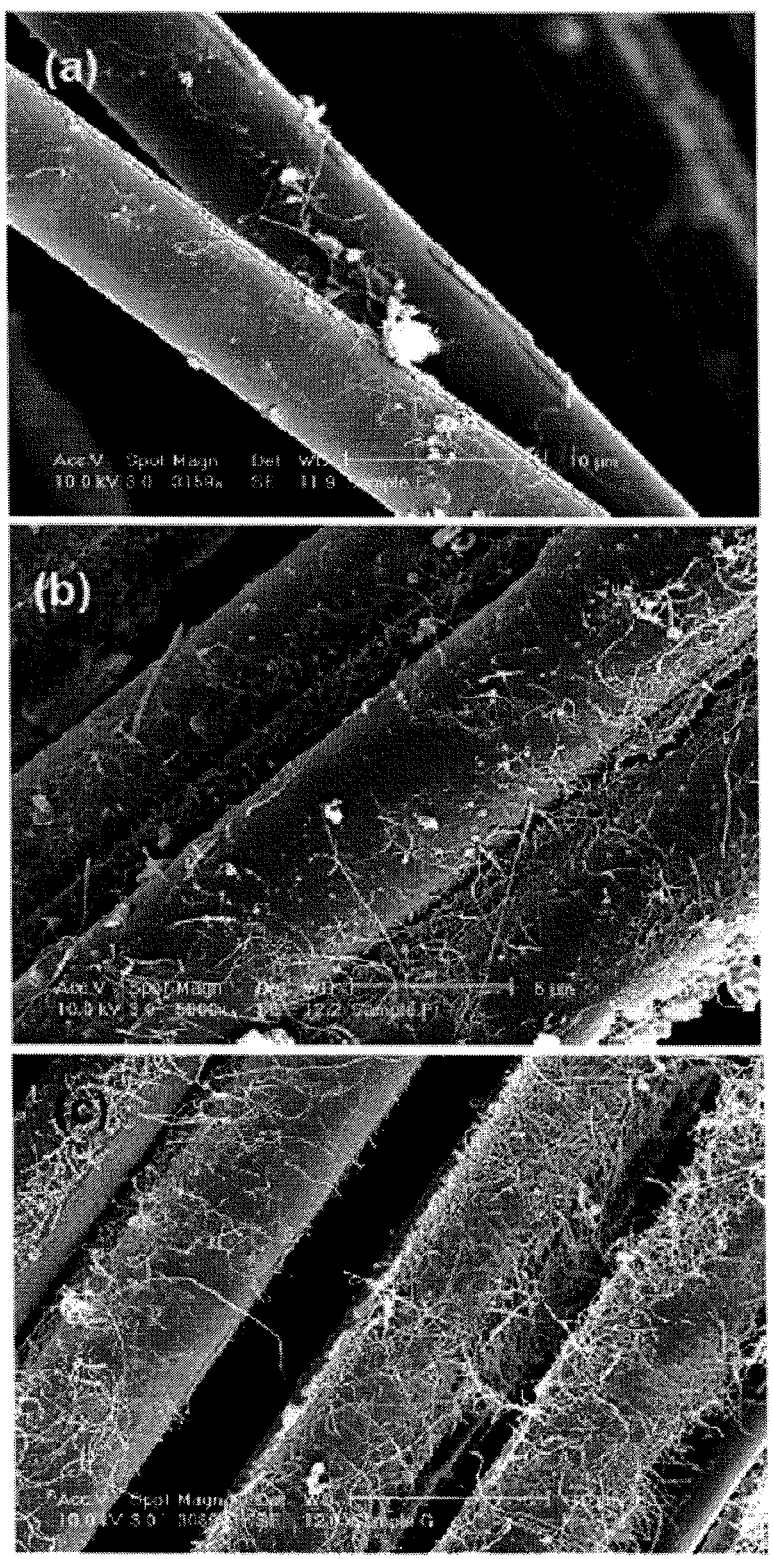
FIGS. 7A-7C are SEM micrographs of IM7 carbon fabric having MWNTs electrophoretically deposited on the surface from an aqueous dispersion with an electric field of about 8V/cm; (7A) approximately 30 minute deposition time; (7B) approximately 60 minute deposition time; (7C) approximately 90 minute deposition time.

In order to improve the deposition efficiency, aqueous CNT dispersions containing electrolytes were also used to examine the effect of the electrolyte on the nanotube deposition rate and homogeneity. The aqueous dispersion was prepared with a concentration of MWNTs in water ranging between approximately 0.01-0.1 mg/mL and NaOH in a concentration of approximately 1%. The dispersion so prepared possessed a pH of approximately 7-8. Due to the high conductivity of the dispersion containing NaOH, the applied electric field was reduced from that used in previously in the aqueous dispersion without NaOH, to about 8 V/cm. FIG. 7A illustrates the CNT deposition after about 30 minutes, while FIGS. 7B and 7C illustrate the CNT deposition after 60 and 90 minutes, respectively.

The SEM images of FIGS. 7A-7C demonstrate that the deposition of MWNTs is substantially homogeneous throughout the fabric thickness and that the density of deposited nanotubes increases with time. Notably, electrophoretic deposition for about 90 minutes (FIG. 7C) resulted in almost complete transfer of the MWNTs from the dispersion onto the surface of carbon fabric.

To further examine the adherence of the MWNTs to the fiber surface, the MWNT-fiber surfaces were subjected to a tape pull test. In this test, an adhesive tape was depressed on, and removed from, the fiber surface upon which the nanotubes are deposited. After removal of the tape, the adhesive tape surface and the fiber surface was examined to determine the extent of MWNT removal. Notably, the MWNTs did not appear to be removed during the tape test, indicating that the nanotubes are strongly attached to the carbon fiber surface.

Example 4

Deposition Using Organic Dispersion Media

To examine the influence of organic dispersion mediums, MWNTs having a length of approximately 3 μm, after a nitric acid treatment as discussed above, were deposited from an ethanol dispersion. The dispersion was prepared by adding MWNTs to ethanol and sonicating the mixture using a bath sonicator at a power of approximately 270 W for approximately 12 h. After sonication, a stable dispersion having an MWNT density of approximately 0.01 mg/mL was obtained.

IM7 carbon fabric was placed into the ethanol MWNT dispersion and the voltage between the fabric and electrodes was varied in order to examine the deposition process from ethanol. It was observed, however, that application of voltages up to about 60 V did not result in substantial registration of current. This result indicates that, when dispersed within ethanol, the MWNTs may not carry sufficient charge to move in response to the electric field.

Figure 8:
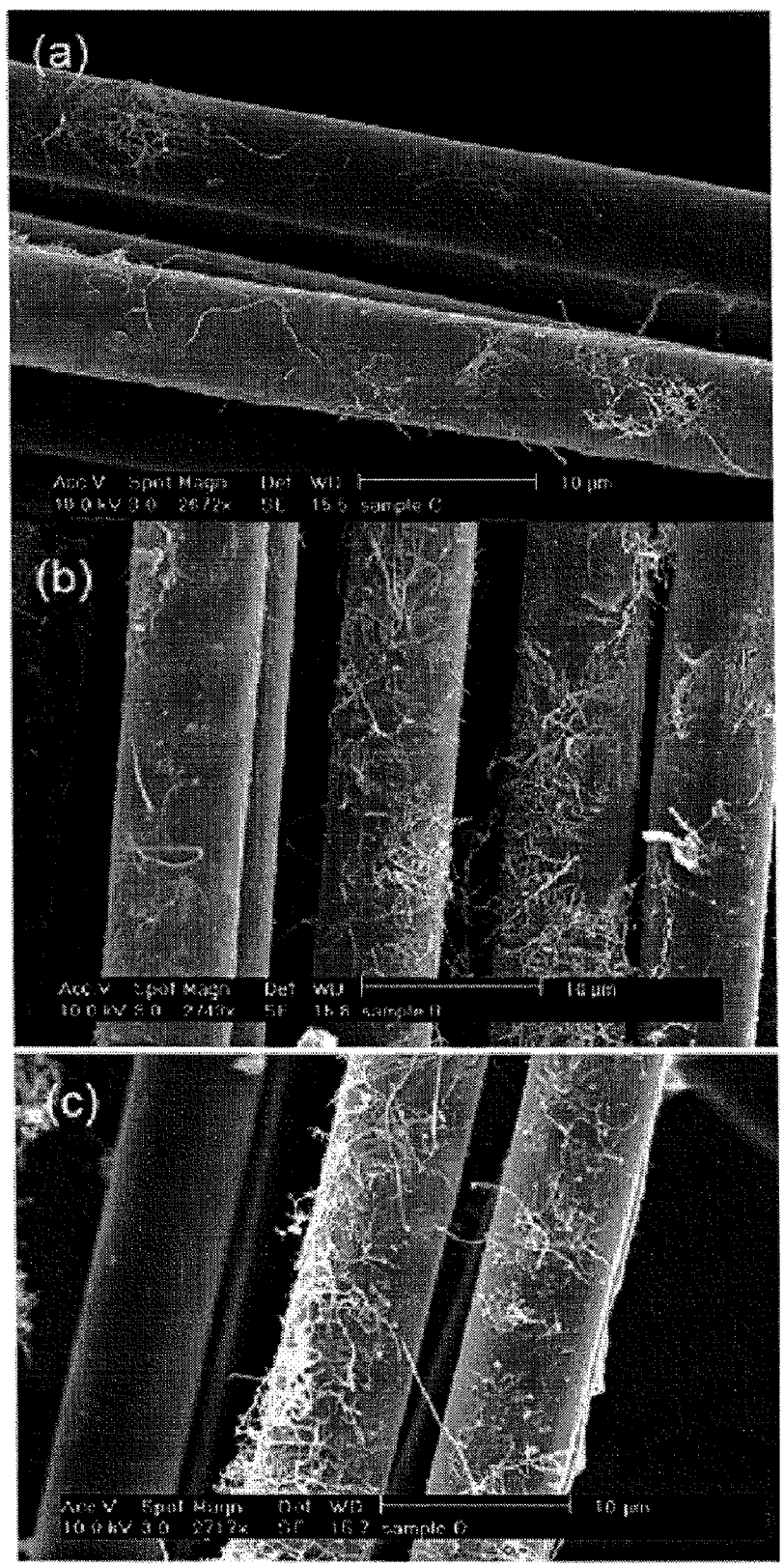
FIGS. 8A-8C are SEM micrographs of IM7 carbon fabric having MWNTs electrophoretically deposited on the surface from an ethanol dispersion with an electric field of about 20V/cm; (8A) approximately 30 minute deposition time; (8B) approximately 60 minute deposition time; (8C) approximately 90 minute deposition time.

To facilitate MWNT deposition, NaOH was added to the ethanol dispersion in a concentration less than about 1% to serve as an electrolyte and induce current flow. The NaOH results in the selective adsorption of ions to the nanotube walls and provides the charge necessary to result in electrophoretic deposition. MWNTs deposited from ethanol dispersions containing NaOH at an electric field of approximately 20 V/cm for approximately 30, 60, and 90 minutes, are illustrated in the SEM micrographs of FIGS. 8A-8C, respectively. The micrographs illustrate that MWNTs are deposited on the carbon fiber surfaces and that the density of deposited MWNTs increases with deposition time. Thus, these results indicate that the NaOH electrolyte increased the current flow within the dispersion to a level sufficient to allow CNT deposition from the organic dispersion medium.

Example 5

Post-Treatment of Hybrid CNT/Fibers for CNT Orientation

In order to further examine the post-treatment processing of hybrid CNT/fibers, two sets of reinforcement samples were prepared. In each case, MWNTs were initially deposited on IM7 carbon fibers using a aqueous dispersion of MWNTs having a CNT density of approximately 0.05 mg/ml at an applied electric field of about 4 V/cm. After deposition, the first sample had a CNT concentration of about 0.04 wt. %, with respect to the weight of the fiber, while the second sample had a CNT concentration of about 0.08 wt. %, with respect to the weight of the fiber. The first sample was post-treated with an electric field of about 2 kV/cm for approximately 3 hours. The second sample was prepared similarly to the first, however, after post-treatment, was again subjected to electrophoretic deposition of MWNTs on the fiber surface, followed by post-treatment of the MWNT/fiber substrate at an applied electric field of about 2 kV/cm for about 3 hours.

Example 6

Fiber-Matrix Interface Engineering

Figure 9:
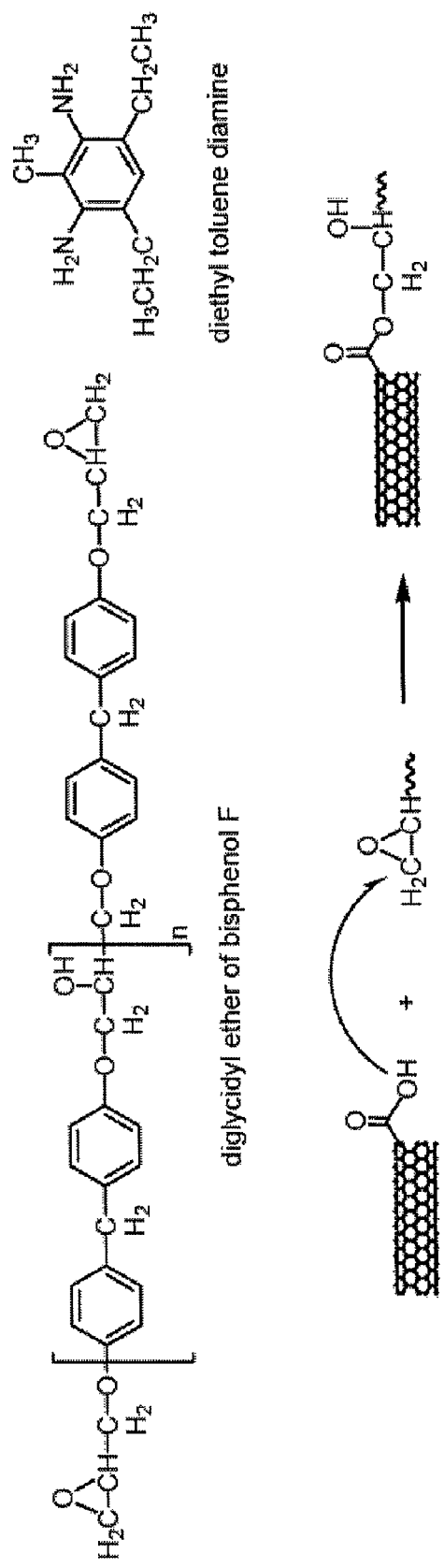
FIG. 9 illustrates a schematic of one embodiment of a cross-linking reaction between CNTs and epoxy resins.

As previously noted above, the nitric acid pretreatment of CNTs, applied in order to control their length, further introduces carboxylic acid groups into the CNTs. These functional groups may cross-link with epoxy resins upon curing of the resin. A schematic illustration of one embodiment of such a cross-linking reaction is illustrated in FIG. 9. The carboxylic acid group of the functionalized CNTs reacts with the H2C—O—CH— three membered ring of diglycidyl ether of bisphenol F (DGEBF), resulting in a strong interface between the hybrid CNT/fibers and polymer matrices. Advantageously, this strong interfacial bond allows for efficient integration of the hybrid CNT/fibers into composites and yields tailored, multifunctional materials for high-performance, multi-mission tactical spacecraft.

In alternative embodiments, strong interfaces between polymer resins and the hybrid CNT/fibers can be achieved by grafting aminophenyl and carboxyphenyl groups to the surfaces of both the CNTs and the fiber substrate. This grafting may be accomplished by spontaneous or electrochemical reaction of diazonium salts with carbon fibers. For example, the carboxyphenyl group may be introduced directly from the corresponding diazonium salt. In another example, the aminophenyl group may be attached via the reduction of a nitrophenyl group introduced from the diazonium salt. A solution of the diazonium salt is prepared in acetonitrile, dimethylformamide, or water, which is purged with an inert gas.

For spontaneous covalent grafting, the carbon fiber is immersed in the diazonium salt solution for approximately 30 minutes to 4 hours. For electrochemical grafting, the carbon reinforcement is immersed in a solution of the diazonium salt, which is purged with an inert gas for about 15-30 minutes. A potential, which substantially corresponds to the reduction peak in the cyclic voltammogram of the diazonium salt, is applied to the carbon reinforcement for approximately 1 to 3 hours. Subsequently, the fiber is rinsed with a solvent to remove physisorbed salt and/or reaction products. The aminophenyl group is prepared directly from the attached nitrophenyl group through electrochemical reduction in water.

The attached aminophenyl or carboxyphenyl groups readily cross-link with epoxy, vinyl ester groups from the polymer matrix, and the curing agent. Advantageously, either the spontaneous or electrochemical diazonium salt surface modification techniques may be readily incorporated into the processing techniques discussed above with respect to FIG. 1.

In summary, the use of electrophoretically deposited hybrid CNT/fibers for reinforcement of composite materials solves a major drawback in fiber-reinforced composites, the presence of matrix rich regions where cracks may initiate and propagate. In one aspect, the hybrid CNT/fibers provide reinforcement of the polymer matrix at both micro level (fibers) and the nano-level (CNTs). In another aspect, CNT-modified fibers may be engineered to increase the strength of the fiber-matrix interface through the chemistry of the CNTs. In a further aspect, a reduced amount of CNTs required, relative to all-CNT fibers leads to reduced cost of manufacturing. Additionally, manufacturing and scale-up of the hybrid CNT/fibers and composites reinforced with these materials is relatively simple, further reducing manufacturing costs compared with conventional approaches.

Although the foregoing description has shown, described, and pointed out the fundamental novel features of the present teachings, it will be understood that various omissions, substitutions, and changes in the form of the detail of the apparatus as illustrated, as well as the uses thereof, may be made by those skilled in the art, without departing from the scope of the present teachings. Consequently, the scope of the present teachings should not be limited to the foregoing discussion, but should be defined by the appended claims.

What is claimed is:

1. A method of forming a hybrid carbon nanotube-fiber structure, comprising:
    selecting a plurality of fibers;
    obtaining a first carbon nanotube dispersion comprising a first plurality of carbon nanotubes, wherein the concentration of the first plurality of carbon nanotubes within the dispersion is greater than or equal to about 0.01 mg/mL;
    placing the plurality of fibers in a vessel containing the first dispersion and adjacent to a plurality of electrodes, the vessel including a conductive frame for supporting the plurality of fibers; and
    generating an electric field between the plurality of fibers and a plurality of electrodes so as to cause at least a portion of the CNTs within the dispersion to be deposited on the sidewalls of the fibers, wherein the conductive frame is configured to control the uniformity of the electric potential distribution of the generated electric field to aid in depositing the at least a portion of the CNTs on the sidewalls of the fibers.

2. The method of claim 1, wherein the plurality of fibers comprise carbon-based fibers.

3. The method of claim 1, wherein the conductive frame comprises stainless steel.

4. The method of claim 1, wherein the plurality of fibers comprise a substantially continuous length of fibers which are continuously fed through the vessel so as to produce a substantially continuous length of fibers having carbon nanotubes deposited on their surface.

5. The method of claim 1, wherein the carbon nanotubes comprise at least one of single-walled and multi-walled carbon nanotubes.

6. The method of claim 1, wherein the length of the first plurality of carbon nanotubes ranges between approximately 200 nm to 10 μm.

7. The method of claim 6, further comprising repeating the deposition method with the same plurality of fibers, wherein a second plurality of carbon nanotubes is obtained which possess an length between approximately 200 nm to 10 μm, and wherein the length of the first and second plurality of carbon nanotubes are not equal.

8. The method of claim 1, wherein the first plurality of carbon nanotubes are dispersed in a medium selected from water and alcohols.

9. The method of claim 8, wherein the dispersion further comprises sodium hydroxide in a concentration less than about 1 vol. % on the basis of total volume of the dispersion so as to facilitate deposition of the CNTs on the fiber.

10. The method of claim 1, wherein the concentration of the first plurality of carbon nanotubes within the dispersion is approximately 0.01-0.1 g/mL.

11. The method of claim 1, wherein the electric field comprises a DC electric field having a strength of about 4 to 20 V/cm.

12. The method of claim 1, further comprising orientating at least a portion of the deposited CNTs along a direction substantially perpendicular to the length of the plurality of fibers by applying a DC electric field to the deposited CNTs in air or vacuum for a duration ranging between about 2 to about 4 hours, the DC electric field having a strength ranging between about 2 kV/cm to about 4 kV/cm.

13. The method of claim 1, further comprising, prior to placement of the fibers within the dispersion, removal of a sizing from the surface of the fibers by annealing the fibers at a temperature greater than or equal to about 700° C. and subsequently refluxing the fibers in nitric acid having a molarity ranging between about 7 to 16M for between about 30-60 minutes.

14. The method of claim 1, further comprising impregnating the carbon-nanotube/fiber structure with a polymer matrix to form a composite material.

15. A method of forming a hybrid carbon nanotube-fiber structure, comprising:
    selecting a plurality of carbon nanotubes;
    treating the plurality of carbon nanotubes with nitric acid so as to introduce oxygen containing functional groups onto the carbon nanotubes;
    dispersing the carbon nanotubes within a dispersion medium in a selected concentration;
    selecting a plurality of carbon-based fibers;
    supporting the plurality of carbon-based fibers using a conductive frame; and
    electrophoretically depositing at least a portion of the carbon nanotubes contained within the carbon nanotube dispersion on the sidewalls of the carbon-based fibers, wherein electrophoretically depositing the at least a portion of the carbon nanotubes comprises using the conductive frame to control the uniformity of the electric potential distribution to aid in depositing the at least a portion of the carbon nanotubes on the sidewalls of the carbon-based fibers.

16. The method of claim 15, wherein the carbon nanotubes comprise at least one of single-walled and multi-walled carbon nanotubes.

17. The method of claim 15, wherein the carbon nanotubes vary in length from about 200 nm to 10 μm.

18. The method of claim 15, wherein the nitric acid strength is between about 7 to 16 M and the refluxing time is between about 30 minutes to 12 hours.

19. The method of claim 15, wherein the oxygen containing functional groups comprise carboxylic acid groups.

20. The method of claim 15, wherein the dispersion medium is selected from water and alcohols.

21. The method of claim 20, wherein the dispersion medium further comprises NaOH in a concentration less than or equal to about 1% by volume based upon the total volume of the dispersion.

22. The method of claim 15, wherein the concentration of carbon nanotubes within the dispersion ranges between about 0.01 and 0.1 mg/mL.

23. The method of claim 15, further comprising modification of the surface of the carbon-based fiber and carbon nanotubes by grafting of aminophenyl and carboxyphenyl groups to the surfaces.

24. The method of claim 23, wherein the modification comprises immersion of the carbon nanotube/carbon-based fiber structure, for between approximately 30 minutes to 4 hours, in a diazonium salt solution prepared from one of acetonitrile, dimethylformamide, and water and purged with an inert gas.

25. The method of claim 24, wherein surface modification further comprises applying a potential, corresponding to about the reduction peak in the cyclic voltammogram of the diazonium salt, to the carbon nanotube/carbon-based-fiber structure for between about 1 to 3 hours.

26. The method of claim 15, further comprising, after deposition of the carbon nanotubes, placing at least a portion of the plurality of fibers within an electric field oriented substantially perpendicular to the length of the plurality of fibers, wherein the electric field strength is approximately 1 to 4 kV/cm, and wherein the plurality of fibers are held within the electric field for between approximately 2 to 4 hours so as to induce the deposited CNTs to reorient themselves substantially perpendicular to the length of the fibers.

27. The method of claim 15, further comprising, prior to placement of the fibers within the dispersion, removal of a sizing from the surface of the fibers.

28. The method of claim 15, further comprising impregnating the carbon-nanotube/fiber structure with a polymer matrix to form a composite material.

* * * * *